United States Patent
Coutts et al.

(10) Patent No.: US 12,496,627 B2
(45) Date of Patent: Dec. 16, 2025

(54) METHOD, SYSTEM AND SIGNAL GENERATOR FOR TREATING A DEVICE TO RESIST FORMATION AND BUILD-UP OF SCALE DEPOSITS

(71) Applicant: Clearwell Energy Holdings Limited, Aberdeen (GB)

(72) Inventors: Keith Coutts, Westhill (GB); Graeme Dorrance, Stonehaven (GB); Martin Clark, Lymington (GB); Rahil Joshi, Aberdeen (GB); Stuart Ferguson, Kingswells (GB)

(73) Assignee: Clearwell Energy Holdings Limited, Aberdeen (GB)

( * ) Notice: Subject to any disclaimer, the term of this patent is extended or adjusted under 35 U.S.C. 154(b) by 0 days.

(21) Appl. No.: 18/247,792

(22) PCT Filed: Dec. 14, 2021

(86) PCT No.: PCT/EP2021/085783
§ 371 (c)(1),
(2) Date: Apr. 4, 2023

(87) PCT Pub. No.: WO2022/129106
PCT Pub. Date: Jun. 23, 2022

(65) Prior Publication Data
US 2023/0330721 A1  Oct. 19, 2023

(30) Foreign Application Priority Data
Dec. 15, 2020  (GB) ..................... 2019833

(51) Int. Cl.
*B08B 17/02* (2006.01)
*B08B 7/00* (2006.01)
*E21B 37/00* (2006.01)

(52) U.S. Cl.
CPC ............ *B08B 17/02* (2013.01); *B08B 7/0035* (2013.01); *E21B 37/00* (2013.01)

(58) Field of Classification Search
CPC ......... B08B 17/02; B08B 7/0035; B08B 7/02; E21B 37/00; E21B 37/08
See application file for complete search history.

(56) References Cited

U.S. PATENT DOCUMENTS 5,514,283 A * 5/1996 Stefanini ................. B08B 17/02
210/695
5,667,677 A * 9/1997 Stefanini ................. B01J 19/129
210/243

(Continued)

FOREIGN PATENT DOCUMENTS

GB  2409503 A  * 6/2005  ............. B08B 17/02
GB  2440725 A  * 2/2008  ............. C02F 1/487

(Continued)

OTHER PUBLICATIONS

RU 2503797 C1 (Year: 2014).*

(Continued)

*Primary Examiner* — Alexander Markoff
(74) *Attorney, Agent, or Firm* — Harness, Dickey & Pierce, P.L.C.

(57) ABSTRACT

A method of treating a device to resist formation and build-up of scale deposits at the device is provided. The device is located in a fluid-containing conduit. The method comprises feeding a radio frequency (RF) signal into a line connected to a device located in a fluid-containing conduit; and propagating the RF signal along the line to the device to resist formation and/or build-up of scale deposits at the device. A system for treating a device to resist formation and build-up of scale deposits at the device is also provided. A signal generator operable to generate an RF signal for treating a device to resist formation and build-up of scale (Continued)

deposits at the device is also provided. The signal generator is operable to feed the RF signal into a line connected to the device and to propagate the RF signal along the line to the device to resist formation and/or build-up of scale deposits at the device.

18 Claims, 6 Drawing Sheets

(56) References Cited

U.S. PATENT DOCUMENTS

| | | | | |
|---|---|---|---|---|
| 9,181,113 | B2* | 11/2015 | Clark | C02F 1/487 |
| 9,624,118 | B2* | 4/2017 | Clark | C02F 1/30 |
| 10,023,482 | B2* | 7/2018 | Clark | C02F 1/487 |
| 2002/0185067 | A1* | 12/2002 | Upham | B08B 7/0035 |
| | | | | 134/1.1 |
| 2003/0121862 | A1* | 7/2003 | Holland | E21B 36/04 |
| | | | | 210/695 |
| 2004/0011381 | A1* | 1/2004 | Klebanoff | C03C 23/0075 |
| | | | | 134/201 |
| 2004/0222188 | A1* | 11/2004 | Kim | B08B 7/0035 |
| | | | | 216/67 |
| 2006/0144820 | A1* | 7/2006 | Sawin | B08B 7/0035 |
| | | | | 134/1.1 |
| 2007/0051388 | A1* | 3/2007 | Sorensen | C23C 16/452 |
| | | | | 134/1.1 |
| 2008/0067129 | A1* | 3/2008 | Juenke | B08B 17/00 |
| | | | | 166/305.1 |
| 2009/0047447 | A1* | 2/2009 | Sawin | B08B 7/0035 |
| | | | | 252/372 |
| 2009/0188524 | A1* | 7/2009 | New | C30B 25/14 |
| | | | | 134/1.1 |
| 2010/0186958 | A1 | 7/2010 | Stefanini | |
| 2011/0240131 | A1 | 10/2011 | Parker | |
| 2011/0284231 | A1 | 11/2011 | Becker | |
| 2012/0217815 | A1* | 8/2012 | Clark | H01F 38/14 |
| | | | | 307/104 |
| 2013/0151156 | A1* | 6/2013 | Noui-Mehidi | G01V 3/06 |
| | | | | 702/7 |

FOREIGN PATENT DOCUMENTS

| | | |
|---|---|---|
| RU | 2503797 C1 | 1/2014 |
| WO | WO-9112409 A1 | 8/1991 |

OTHER PUBLICATIONS

WO 2013/119138 A1 (Year: 2013).*
WO 91/12409 (Year: 1991).*
CN 209413887 (Year: 2020).*
International Search Report PCT/ISA/210 and Written Opinion PCT/ISA/237 for International Application No. PCT/EP2021/085783 dated Apr. 14, 2022.
Great Britian Search Report dated Sep. 20, 2021.
International Preliminary Report on Patentability, dated Jun. 29, 2023, issued in corresponding International Patent Application No. PCT/EP2021/085783.

* cited by examiner

METHOD, SYSTEM AND SIGNAL GENERATOR FOR TREATING A DEVICE TO RESIST FORMATION AND BUILD-UP OF SCALE DEPOSITS

CROSS-REFERENCE TO RELATED APPLICATIONS

This application is a national phase under 35 U.S.C. § 371 of PCT International Application No. PCT/EP2021/085783 which has an International filing date of Dec. 14, 2021, which claims priority to UK Application No. 2019833.9, filed Dec. 15, 2020, the entire contents of each of which are hereby incorporated by reference.

TECHNICAL FIELD

The subject disclosure relates generally to scale deposits and in particular to a method of treating a device to resist formation and build-up of scale deposits, and a system and signal generator therefor. In some particular examples, the subject disclosure relates in particular to a method of treating a device to resist formation and build-up of scale deposits at devices in a well.

BACKGROUND

Scale is the build-up of deposits, e.g. mineral salt deposits, on surfaces, such as pipes, or equipment in contact with fluid, such as downhole equipment used in wells for oil and gas discovery, recovery and production. In particular, calcium and magnesium, which are commonly contained in water, are heavily involved in the formation of scale.

Scale is formed when mineral ions present in a fluid reach conditions at which they change phases from liquid to solid. Ions present in a fluid require energy to begin the process of forming a solid. Formation of a solid on an existing surface, such as the external surface of an electric submersible pump (ESP), requires less energy. Accordingly, it is on surfaces with which the fluid comes into contact that mineral ions most frequently undergo their phase change to solids. The solids form on, and adhere to, these surfaces, creating scale.

When scale builds on equipment within a pipe, it alters the flow of the fluid through the pipe. By decreasing the volume of fluid that flows through a pipe, scale requires pumps and other industrial equipment to use more energy in order to transport the same volume of fluid. Scale may also increase pressure in a pipe, which can cause leaks and breakages. Because heat provides energy to fuel the ions' phase change to solid, scale build-up on heated equipment, such as steam boilers and heat exchangers, is especially problematic. Scale formation on these devices may lead to reduced heat transmission, higher fuel usage, reduced cooling capacity, decreased runlife and even local overheating and failure. The build-up of scale may have a number of indirect effects, such as providing a location for bacteria to build up and preventing cleaning.

A number of methods to resist scale formation and build-up on equipment are known. For instance protective coatings can be applied to the equipment prior to submersion in a liquid. In another example, chemical solutions can be introduced into fluid surrounding the equipment. The use of chemical solutions, however, is undesirable both because it requires constant replenishment and because it contaminates the fluid. Furthermore, dosing units used to introduce chemical solutions add bulk to equipment within the fluid decreasing the volume of fluid which can flow through a pipe containing the equipment causing the previously-discussed issues.

In addition, in order to determine a suitable method for resisting scale formation and build-up, sensors are positioned at a location near, proximate or adjacent the equipment in order to detect environmental conditions. Temperature, pressure, pH and/or fluid flow rate are detected to select a suitable method. These parameters may also be used to select a particular chemical solution or scale inhibitor formulation suitable for the determined environmental conditions. The described sensing equipment may add complexity and cost, and may reduce available flow cross section. Additionally, time to assess detected parameters and formulate an inhibitor formulation may increase costs, and require significant time to complete.

This background serves only to set a scene to allow a person skilled in the art to better appreciate the following description. Therefore, none of the above discussion should necessarily be taken as an acknowledgement that this discussion is part of the state of the art or is common general knowledge. One or more aspects/embodiments of the invention may or may not address one or more of the background issues.

SUMMARY

According to an aspect of the disclosure there is provided a method of treating a device to resist formation and build-up of scale deposits at the device, the device located in a fluid-containing conduit.

The method may provide a more efficient manner of treating a device to resist formation and build-up of scale deposits. The method may require fewer or no additional components to be added to the device to resist formation and build-up of scale deposits.

The method may be used to treat a device already in-situ in a fluid-containing conduit without adding additional components, cables, lines, wiring, modules, hardware or the like to the device. For example, the method may not require the addition of one or more sensors proximate to the device to detect conditions at the device. The method may additionally or alternatively not require dosing units or similar configured to introduce chemical solutions to resist formation and/or build-up of scale deposits. Such a method may be more efficient to install and to operate than existing methods.

The method may comprise feeding a radio frequency (RF) signal into a line connected to a device located in a fluid-containing conduit. The signal may be fed into the line via a direct electrical connection or induction. Induction may comprise contact or non-contact induction. Induction may comprise establishing a field around the line to feed the RF signal into the line.

The method may comprise injecting an RF signal into a line connected to a device located in a fluid-containing conduit in so far as a person skilled in the art would appreciate the terms feeding and injecting are used interchangeably and have the same meaning.

The method may comprise propagating the RF signal along the line to the device to resist formation and/or build-up of scale deposits at the device.

The line provides a signal path for the fed RF signal. As the line is connected to the device, the RF signal is propagated along the line to the device. The RF signal is thereby directed to the device to resist formation and build-up of scale deposits at the device. The line may thereby assist with directing the RF signal specifically to the device to resist formation and build-up of scale deposits at the device. This may prevent attenuation of the RF signal which may result if a signal was fed towards the device, e.g. fed into a component not connected to the device.

The line may be an existing line configured for use with the device. As such, no additional line may be added to the device in the implementation of the method.

The device may comprise a downhole device.

The downhole device may comprise a valve or a pump.

The device may be an electric submersible pump (ESP). Formation of scale on the external surface of an ESP may require less energy than on other surfaces and may therefore be more likely. Scale formation or build-up on an ESP may lead to reduced heat transmission, higher fuel usage, reduced cooling capacity, decreased runlife, and even local overheating and failure. Conventional methods of treating scale formation and build-up on an ESP include adding a dosing unit to the ESP which introduces chemical solutions. However, the use of chemical solutions is undesired as it contaminates fluid. Furthermore, the addition of a dosing unit adds bulk to the ESP decreasing the volume of fluid which can flow through a conduit or pipe containing the ESP. The described method requires no such contamination or additional unit to be added to the ESP.

The line may be electrically insulated. The RF signal may be propagated within insulation. The insulation may be configured to prevent the majority of the RF signal from propagating away from the device. In other words, the insulation may ensure the majority of the RF signal fed into the line is propagated along the line and reaches the device.

The line may comprise a power line for providing power to the device, a control line for controlling the device, or a combination of both. The control line may be a hydraulic line or an electrical line.

The line may comprise a single phase of a three-phase power cable. The line may comprise multiple phases of a three-phase power cable. As such, the RF signal may be injected into multiple phases of a three-phase power cable.

The line may comprise a shielding layer of a cable.

The fluid-containing conduit may comprise a wellbore of a well. As such, the device located in the well may be treated to resist formation and build-up of scale deposits at the device without requiring additional lines, e.g. power lines, control lines, etc., to be run into the well. Additionally, the device need not be removed from the well to add components such as dosing units to the device in order to treat the device.

The well may be an oil and gas well from which hydrocarbons are produced at some point in the well's lifecycle. The well may be a geothermal well. The fluid within the geothermal well may comprise mostly water. Water is generally electrically conductive. As such, water is not suitable for signal propagation, such as a RF signal. As previously described, the line may be electrically insulated. The RF signal may be propagated within insulation, armour of a cable, and/or shielding of a cable. The cable may be a power or control cable. The insulation may be configured to prevent the majority of the RF signal from propagating away from the device. In other words, the insulation may ensure the majority of the RF signal fed into the line is propagated along the line and reaches the device. This may provide a signal path through the otherwise unsuitable signal path of water in a geothermal well, or other fluid combination in a geothermal or other well.

The RF signal may be a pulsed RF signal.

Feeding the RF signal may comprise feeding RF signal pulses to the line.

The method may further comprise selecting a signal parameter based on a device parameter prior to propagating the RF signal.

The signal parameter may comprise at least one of signal strength, impedance, frequency, voltage and current.

The device parameter may comprise at least one of a distance of the device from a feed point of the RF signal, and a length of the line.

The method may further comprise balancing an electrical load presented by the device.

The method may further comprise collecting an initial electrical load measurement of the device. Balancing may be performed after collecting. Balancing the electrical load may be performed using the initially collected load measurement.

Where the device is located in a well, the method may further comprise feeding the RF signal to the line at a feed point uphole of the device.

The feed point may be outside of a well.

The line may be configured to pass through a valve arrangement to the device. Where the device is located in a well, the valve arrangement may be uphole of the device, e.g. at a wellhead. The line may pass through the valve arrangement such that RF signal is fed into the line and is propagated along the line passes through the valve arrangement to reach the device. The line may be insulated such that the majority of the RF signal propagated through the line reaches the device. The line may be insulated through the valve arrangement.

The RF signal may be fed into the line at an electrical junction box. The electrical junction box may be vented such that gases within the line brought to the surface are vented through the junction box. Where the device is located in a well, gases within the well may be trapped within the line, for example within electrical insulation surrounding the line. Trapped gases may be vented at the electrical junction box to reduce the risk of combustion or damage to equipment by potentially hazardous gases.

The RF signal may be fed to multiple lines electrically connected at the electrical junction box.

According to another aspect there is provided a system for treating a device to resist formation and build-up of scale deposits at the device, the device being located in a fluid-containing conduit.

The system may provide one or more of the previously-discussed benefits of the described method.

The system may more efficiently treat a device to resist formation and build-up of scale deposits. The system may require fewer or no additional components to be added to the device to resist formation and build-up of scale deposits.

The system may comprise a signal generator operable to generate a radio frequency (RF) signal to be fed into a line connected to a device being located in a fluid-containing conduit.

The signal generator may be further operable to propagate the RF signal along the line to the device to resist formation and/or build-up of scale deposits at the device.

The system may be used to treat a device already in-situ in a fluid-containing conduit without adding additional components, cables, lines, wiring, modules, hardware or the like to the device. For example, the system may not require the addition of one or more sensors proximate to the device to detect conditions at the device. The system may additionally or alternatively not require dosing units or similar configured to introduce chemical solutions to resist formation and/or build-up of scale deposits. Such a system may be more efficient to install and to operate than existing methods.

The line may comprise or be an existing line configured for use with the device. As such, no additional line may be added to the device.

The device may comprise a downhole device.

The downhole device may comprise a valve or a pump.

The device may be an electric submersible pump (ESP).

The line may be electrically insulated. The RF signal may be propagated within insulation. The insulation may be configured to prevent the majority of the RF signal from propagating away from the device. In other words, the insulation may ensure the majority of the RF signal fed into the line is propagated along the line and reaches the device.

The line may comprise a power line for providing power to the device, or a control line for controlling the device. The control line may be a hydraulic line or an electrical line.

The line may comprise a single phase of a three-phase power cable.

The line may comprise a shielding layer of a cable.

The fluid-containing conduit may comprise a well. As such, the device located in the device may be treated to resist formation and build-up of scale deposits at the device without requiring lines, e.g. power lines, control lines, etc., to be run into the well. Additionally, the device need not be removed from the well to add components such as dosing units to the device in order to treat the device.

The RF signal may be a pulsed RF signal.

Feeding the RF signal may comprise feeding RF signal pulses to the line.

The signal generator may be further operable to select a signal parameter based on a device parameter prior to propagating the RF signal.

The signal parameter may comprise at least one of signal strength, impedance, frequency, voltage and current.

The device parameter may comprise at least one of a distance of the device from an feed point of the RF signal, and a length of the line.

The signal generator may be further operable to balance a load presented by the device. The signal generator may be further operable to collect an initial load measurement of the device. Balancing may be performing after collecting. Balancing the load may be performed using the initially collected load measurement.

The signal generator may be further operable to feed the RF signal to the line at a location uphole of the device.

The location may be outside of a well.

The line may be configured to pass through a valve arrangement to the device. The line may be insulated such that the majority of the RF signal propagated through the line reaches the device. The line may be insulated through the valve arrangement.

The RF signal may be fed into the line at an electrical junction box. The electrical junction box may be vented such that gases within the line brought to the surface are vented through the junction box.

The RF signal may be fed to multiple lines electrically connected at the electrical junction box.

According to another aspect there is provided a signal generator operable to generate a radio frequency (RF) signal for treating a device to resist formation and build-up of scale deposits at the device, the device being located in a fluid-containing conduit.

The signal generator may be operable to feed the RF signal into a line connected to the device and to propagate the RF signal along the line to the device to resist formation and/or build-up of scale deposits at the device.

The signal generator may provide any of the aforementioned benefits with respect to the described method and/or system.

The signal generator may include or be operable in any of the aforementioned manners described in respect of the method and/or system.

Aspects of the disclosure may include one or more examples, embodiments or features in isolation or in various combinations whether or not specifically stated (including claimed) in that combination or in isolation.

BRIEF DESCRIPTION OF THE DRAWINGS

A description is now given, by way of example only, with reference to the accompanying drawings, in which.

DETAILED DESCRIPTION

Figure 1:
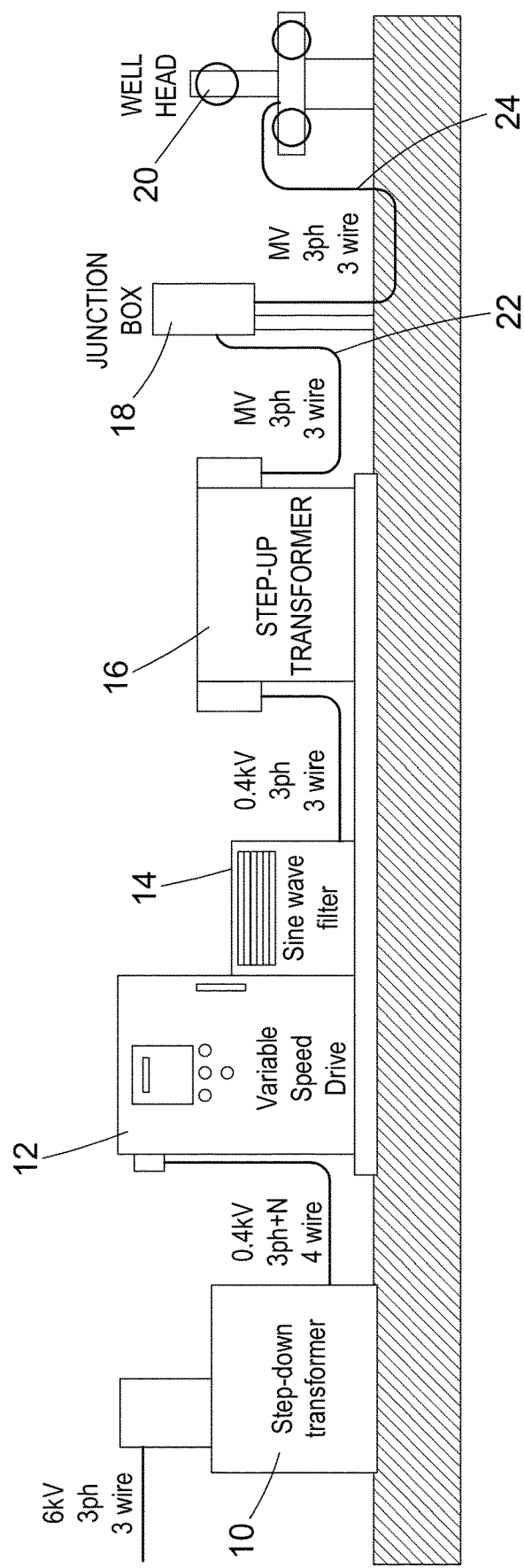
FIG. 1 is a layout of surface equipment at a well.

Referring to FIG. 1, layout of surface equipment at an oil and gas well is illustrated, and in particular surface equipment for providing power downhole, e.g. via a line, such as a cable. Power may be used downhole by various types of devices, such as sensors, valves, ESPs, or other such equipment. The well may be an appraisal, production, abandoned well or the like. In addition, while an on-shore surface well is illustrated, the well may be an off-shore well.

As shown in FIG. 1, a step-down transformer 10 receives power from a three phase (on three wires) 6 kV power line. The step-down transformer 10 reduces the voltage of the received signal to 0.4 kV and is electrically connected via a four wire cable (three phase and neutral) to a variable speed drive 12. The variable speed drive 12 controls operation of a motor through a range of speeds. The step-down transformer 10 is further electrically connected to a sine wave filter 14. The sine wave filter 14 converts a received signal to a sinusoidal signal. The sine wave filter 14 outputs a 0.4 kV signal via a three wire (three phase) cable. The sine wave filter 14 is electrically connected to a step-up transformer 16 which increases the voltage 1 MV. The step-up transfer is electrically connected to an electrical junction box 18 via a three wire cable (three phase wire) 22. The junction box 18 is associated with a wellhead 20 or wellhead equipment of a well via a line connected to or associated in some manner to one or more downhole devices. The downhole devices are located in a fluid-containing conduit, which in this embodiment, is the well. The fluid conduit may be defined by an open hole bore section, well tubulars, such as casing, liner, coiled tubing, jointed tubing, production tubing, velocity strings and/or the like.

In one embodiment, the line is a three wire (three phase) cable 24. The cable 24 is electrically connected to the one or more downhole devices. The cable 24 is connected to the one or more downhole devices via the wellhead 20 of the well. The cable 24 is configured to provide 1 MV voltage to provide power to one or more downhole devices.

In an embodiment, the cable 24 is insulated through the wellhead 20. Such insulation may at least partially prevent unmitigated spread of any signal propagated along the line, which in this embodiment is the cable 24, into the wellhead. In the same or another embodiment, the cable 24 is insulated along a signal path to the one or more downhole devices. Such insulation may at least prevent unmitigated spread of any signal propagated along the line, which in this embodiment is the cable 24, into the well, e.g. tubing, casing, piping, conduit or similar forming the well.

While particular surface equipment has been described, one of skill in the art will appreciate that further equipment may be present. Furthermore, all illustrated equipment need not be present at every type of well. In addition, the described electrical values, e.g. voltages, are exemplary and may be varied depending on design requirements.

As previously stated, the cable 24 running from the junction box 18 to the wellhead 20 provides power to one or more downhole devices. As mentioned, exemplary downhole devices includes pumps, such as an ESP, and valves, or the like, or any other type of equipment that may require power from surface. In this embodiment, the cable 24 is a three wire (three phase) cable. The cable 24 is electrically insulated and passes through the wellhead 20 to provide power to the downhole device. The cable 24 runs downs a wellbore of the well and is electrically connected to the downhole device within the well.

The junction box 18 is vented such that gases brought to the surface from the wellbore within the cable 24 are vented through the junction box 18. Within the junction box 18 the cable 24 is stripped of its electrical insulation to allow for venting of any gases trapped therein.

In an embodiment, the junction box 18 comprises at least one aperture, opening or slit for dissipation of gas from the well. As the cable 24 enters the wellbore, gases in the wellbore may be present within the cable 24. For example, gases may be present between insulation surrounding an insulated portion of the cable 24. Upon entry into the junction box 18, insulation may be removed from the cable 24 and any gases present may dissipate into the junction box 18, and may dissipate through the aperture, opening or slit.

Additionally, in one embodiment, the junction box 18 provides an access point for connecting a signal generator to one or more line, e.g. cables 22 and 24, within the junction box 18 as will be described. Such an access point may be particularly beneficial for installation as will be described.

Fluids within the well such as water, oil, gas, etc., is in contact with the device. As previously described, scale deposits may form and/or build up on the device within the well due to the contact with fluid. Such scale deposits may negatively impact fluid flow through the wellbore and may cause failure or reduction of performance of the downhole device. For example, scale deposits on an ESP may decrease motor efficiency, and/or increase heat at the motor head resulting in failure and resultant production delays. The subject disclosure provides a method and signal generator operable to generate an RF signal for treating a device to resist formation and build-up of scale deposits on the device. Such a signal generator may at least partially address the aforementioned issues.

Figure 2:
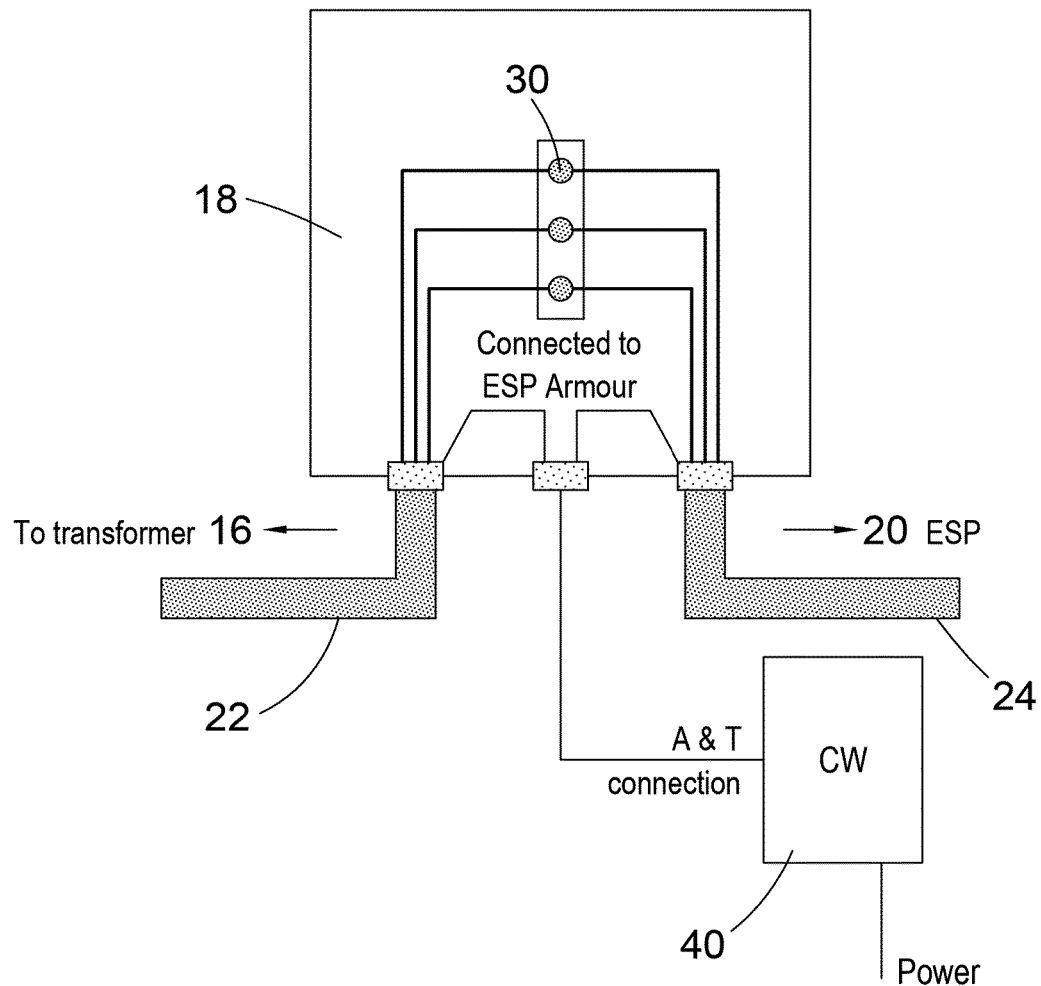
FIG. 2 is a block schematic of a junction box and a signal generator in accordance with an aspect of the subject disclosure.

Referring to FIG. 2, a block schematic of the junction box 18 and a signal generator in accordance with an aspect of the subject disclosure is illustrated. As shown in FIG. 2, the cable 24 is electrically connected to connectors 30 in the junction box 18, and the cable 22 is electrically connected to the connectors 30 in the junction box 18. Accordingly, the three uninsulated wires of the cable 24 are electrically connected to the three uninsulated wires of the cable 22 at connectors 30 within the junction box 18.

A signal generator 40 operable to generate a radio frequency (RF) signal for treating the downhole device in the well to resist formation and build-up of scale deposits at the downhole device is further illustrated in FIG. 2. The signal generator 40 is electrically connected to the cables 22 and 24. The signal generator 40 may electrically connected to a portion of each cable 22 and 24. For example, the signal generator 40 may be electrically connected to conductive armour, e.g. ESP armour, or one or more strands, wires, or cords associated with each cable 22 and 24. The electrical connection may be a direct connection, or alternatively, the signal generator 40 may be configured to induce a signal into the cables 22 and 24. Induction may be contact or non-contact induction.

The signal generator 40 feeds the RF signal into the cable 24 which is connected to the downhole device. The signal generator 40 propagates the RF signal along the cable 24 to the downhole device to resist formation and/or build-up of scale deposits at the downhole device. In this embodiment, the signal generator 40 propagates the RF signal along the cable 24 to the downhole device to resist formation and/or build-up of scale deposits at the downhole device. The RF signal propagated along or in the cable 24 to the downhole device may be within insulation along at least a portion of the cable 24. In other words, the cable 24 may be insulated such that the RF signal is surrounded by insulation as the RF signal is propagated along the cable 24 to the device. The insulation is electrical insulation.

As illustrated in FIG. 2, the signal generator 40 is powered via a power line. The power may be provided via power received at the step-down transform 10 and/or other electrical equipment, or a separate distinct power source.

While the signal generator 40 has been described as being connected to the cable 24 connected to the downhole device, one of skill in the art will appreciate that other configurations are possible. In another embodiment, the signal generator 40 is specifically connected to one phase of the cable 24 connected to the downhole device.

In the illustrated embodiment, the RF signal is fed into the cable 24 and propagated along the cable 24 to the downhole device. The RF signal propagated to the downhole device resists formation and/or build-up of scale deposits at the downhole device without the need for chemicals, electrodes, magnets or other descaling devices mounted on the downhole device.

The cable 24 provides a signal path for the fed RF signal. As the cable 24 is connected to the downhole device, the fed RF signal is propagated along the cable 24 to the device. The RF signal is thereby directed to the device to resist formation and build-up of scale deposits at the device. The cable 24 thereby assists with directing the RF signal specifically to the device to resist formation and build-up of scale deposits at the device. This prevents attenuation of the RF signal which may result if a signal was fed towards the device, e.g. fed into a component not connected to the device. Additionally, the signal generator 40 requires little energy and requires little to no on-going maintenance.

In the illustrated embodiment, the signal generator 40 comprises a diagnostic module which provides diagnostic functionality. The diagnostic module is built into the signal generator 40. The diagnostic module is configured to detect variations in the generated RF signal. The diagnostic module is configured to monitor one or more parameters, e.g.

temperature, of the signal generator 40. The diagnostic module is further configured to monitor the input and output voltage of the RF signal. In an embodiment, the diagnostic module is configured to ensure the RF signal is suitably calibrated for the particular one or more downhole devices, e.g. ESP, pumps, etc., and/or to ensure the signal generator 40 is functioning correctly.

The generated RF signal is an oscillating RF signal which has exponential decaying waveform characteristics. The oscillating RF signal propagates an electromagnetic field throughout the one or more downhole devices. The frequency of the RF signal can be selected to achieve a desired propagation for a particular downhole device. In one embodiment, the frequency of the RF signal is selected to be between about 100 and 220 kHz. In another embodiment, the frequency of the RF signal is selected to be between about 120 and 180 kHz.

In some examples, the RF signal may be generated in bursts, or pulses, which are repeated at variable, pseudo-random intervals. In one embodiment, each pulse has a frequency between 5 kHz and 20 kHz. Accordingly, the pulses are repeated between 5,000 and 20,000 times per second.

Figure 3:
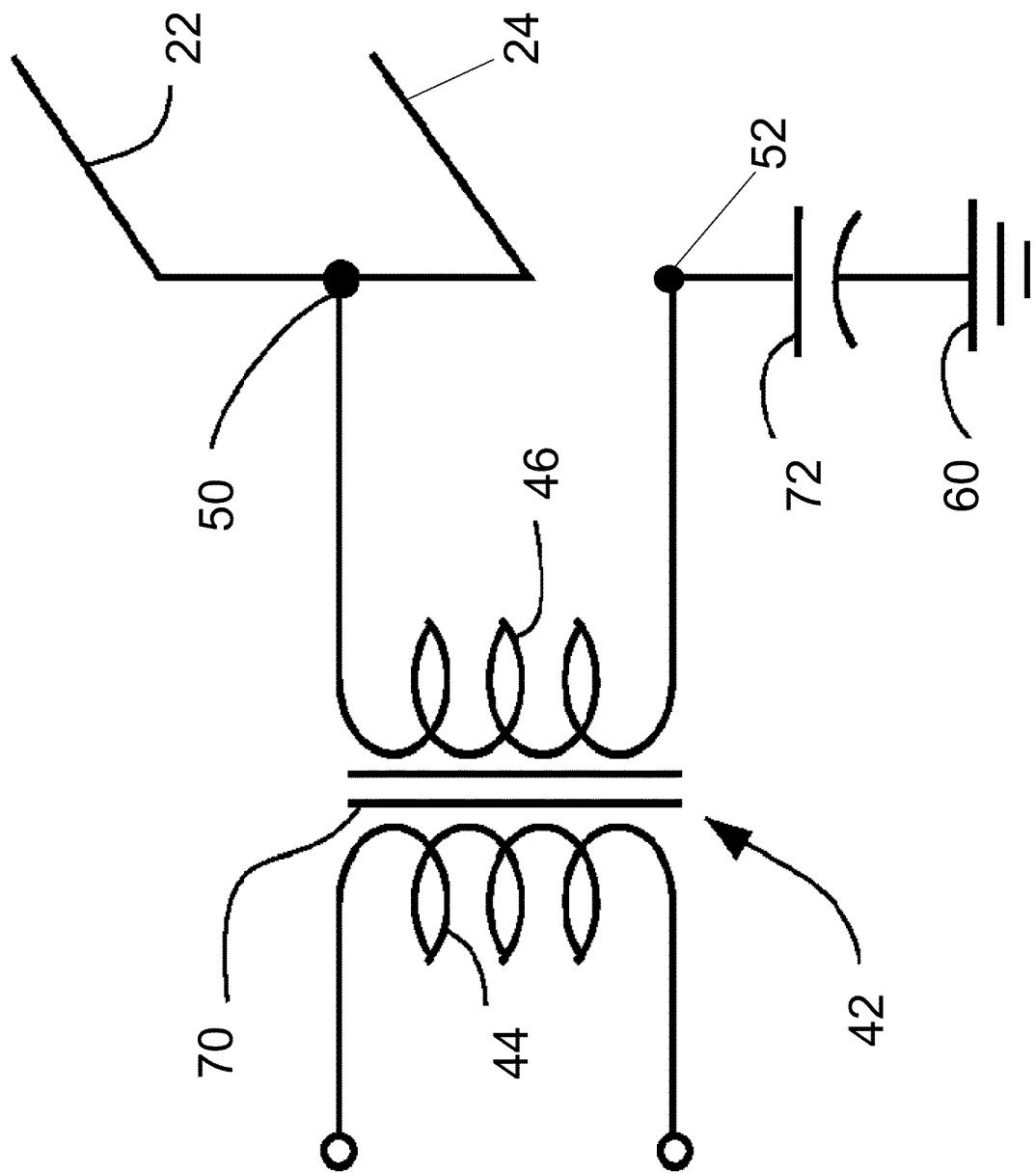
FIG. 3 is a circuit diagram of a signal generator in accordance with an aspect of the disclosure.

Referring now to FIG. 3, a circuit diagram of the signal generator 40 is illustrated. The signal generator 40 comprises a transformer 42. The pulsed RF signal is introduced in the primary coils 44 of the transformer 42. The transformer 42 transfers the RF signal to the secondary coils 46. The RF signal is then fed into a line, e.g. the cables 22, 24, by a connection at a first terminal 50 of the secondary coil 46. Because the downhole device acts as a load, this terminal 50 may also be referred to as a load terminal. In order to provide a low impedance to balance the load presented by the downhole device, a second terminal 52 of the secondary coil 46 is operably connected to ground 60. Accordingly, this terminal 52 may be referred to as a ground terminal.

In the illustrated embodiment, the transformer 42 is a toroidal transformer, having a core 70 that comprises a ferrite ring. This type of transformer 42 operates particularly well at low frequencies.

In the illustrated embodiment, at least the secondary coil 46 of the toroidal transformer 42 is formed by wrapping a number of turns of electrical wire around the ferrite ring core 70. By using wire as the secondary coil 42 of the transformer, the signal generator may be operably connected to cables 22, 24 easily. In the illustrated embodiment, the load terminal 50 and the ground terminal 52 are located at opposite ends of the wire which forms the secondary coil 46.

In another embodiment, a standard transformer unit is used. The load terminal 50 is connected, via electrical wire, to one tap of the secondary coil 46 and the ground terminal 52 is connected, via electrical wire, to another tap of the secondary coil 46. The number of turns of secondary coil 46 between the two taps may be selected to achieve the RF signal having desired properties.

The transformer 42 may have a varying number of turns of primary coil 44 and secondary coil 46. Generally, few turns of both primary coil 44 and secondary coil 46 are needed. By selecting a particular ratio of turns, the voltage of the RF signal used in treating the downhole device may be increased or decreased.

The ground terminal 52 is operably connected to ground 60 to form a current return path from one side of the secondary coil 46 to the other. So as not to provide a specific point for the return path and thereby reduce the potential propagation of the RF signal, the ground terminal 60 is operably connected to ground through a capacitor 72.

The RF signal may be generated and introduced in the primary coil 44 of a transformer 42 in a number of ways. In one embodiment, a microcontroller having a digital to analogue converter (DAC) directly synthesizes the RF signal as a pulsed waveform having the desired characteristics. The RF signal is then amplified, if necessary, and fed to the primary coil 44 of the transformer 42. The RF signal is fed into the line, e.g. cables 22, 24, as described above.

In an embodiment, the signal generator 40 further comprises a tuneable component, e.g. a tuneable capacitor or inductor, for modifying a parameter of the RF signal. In an embodiment, the tuneable component is configured to modify a parameter of the RF signal based on a parameter of the device or line, e.g. cable 24. For example the tuneable component is adjusted to modify a signal strength, impedance, frequency, voltage and/or current of the RF signal. The modification of the parameter may be automatic or manual requiring user input and control.

Figure 4:
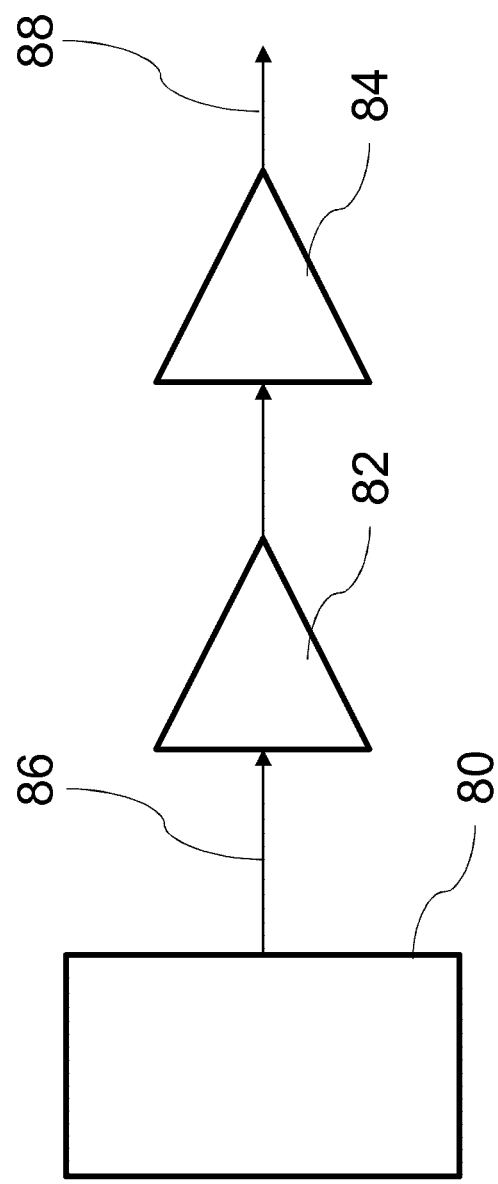
FIG. 4 is a partial circuit diagram of a signal generator in accordance with an aspect of the disclosure.

This embodiment is illustrated in FIG. 4 in which a microcontroller equipped with a digital to analogue converter (DAC) 80 generates, at a set voltage, e.g. 3 V, a signal 86, which comprises an oscillating waveform having a desired frequency and which is pulsed pseudo-randomly. The signal 86 is then shifted and amplified up to a necessary voltage, e.g. 12 V, by a preamplifier 82 and fed to a power amplifier 84, which raises the current of the signal so that it can drive the transformer 42. The resulting amplified signal 88 is introduced to the primary coil 44 of the transformer 42.

In another embodiment, the RF signal is generated by a microcontroller configured to produce short high-current pulses. The short high-current pulses are then shifted and amplified, if necessary, before being switched into a series resonant LC circuit. The LC circuit comprises a high-voltage capacitor and the primary coils of a transformer, which act as the inductor. When charged by the pulse, the LC circuit generates an oscillating waveform having a particular frequency. By selecting the values of inductance (L) and capacitance (C), a user or controller may preselect a frequency that is optimized for a particular device.

Figure 5:
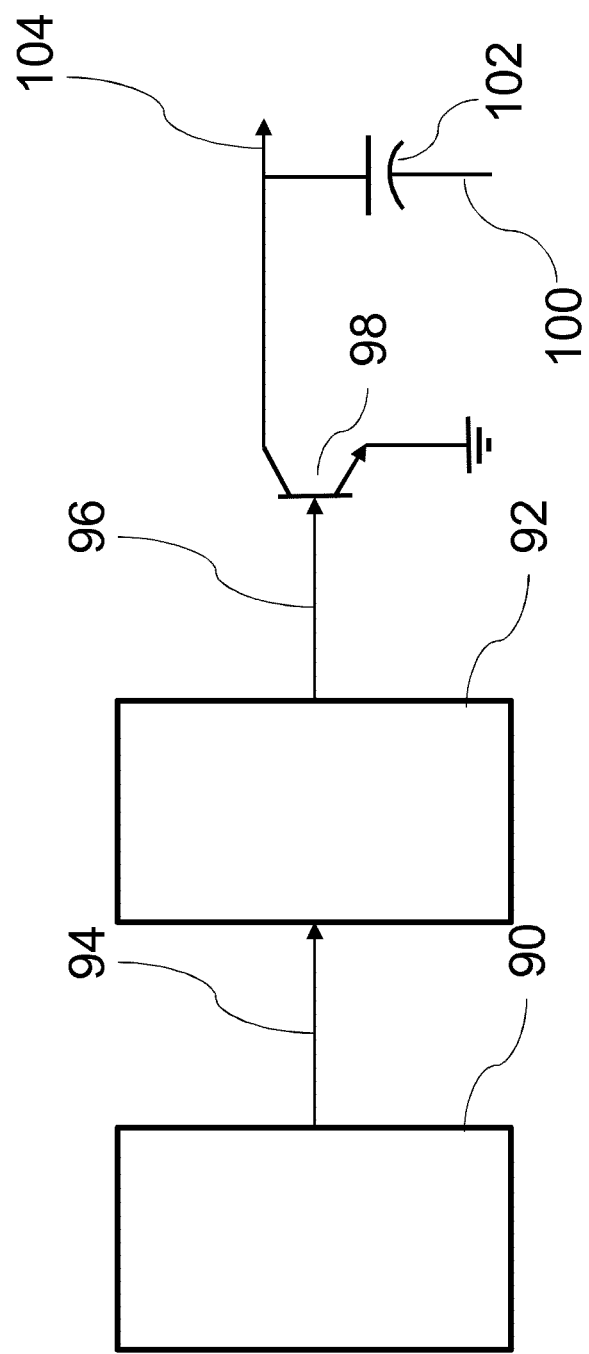
FIG. 5 is a partial circuit diagram of a signal generator in accordance with an aspect of the disclosure.

This embodiment is illustrated in FIG. 5 in which a microcontroller 90 generates, at a particular voltage, e.g. 3 V, short high-current pulses 94 at a frequency that ranges pseudo-randomly between a set frequency range, e.g. 5 and 20 kHz. The pulses 94 are then shifted up to a particular voltage, e.g. 12 V, and the current is amplified by a circuit control processor 92. The amplified pulses 96 are fed to the base of a bipolar transistor 98, where they are switched into a series resonant LC circuit 100. The LC circuit 100 comprises a capacitor 102 and the primary coil 44 of the transformer 42.

The values of inductance (L) and capacitance (C) of the LC circuit 100 are selected to produce an oscillating waveform having a frequency between a particular range, e.g. 100 and 220 kHz. Accordingly, an RF signal 104, which comprises an oscillating waveform with a frequency between 100 and 220 kHz, and that is pulsed pseudo-randomly between the ranges of 5 to 20 kHz, is introduced in the primary coil 44 of a transformer 42.

Figure 6:
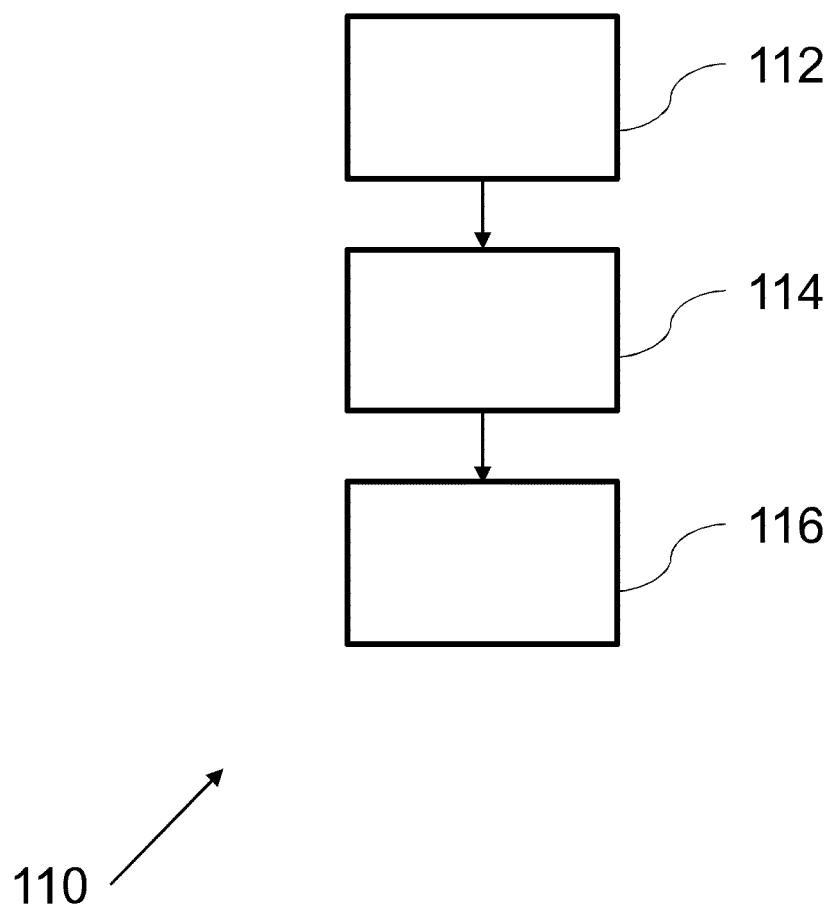
FIG. 6 is a flow chart of a method of treating a device to resist formation and build-up of scale deposits in accordance with an aspect of the disclosure.

FIG. 6 is a flow chart of a method 110 of treating a device to resist formation and build-up of scale deposits in accordance with an aspect of the disclosure. The method 110 comprises feeding 112 an RF signal to a line connected to a device located in a fluid-containing conduit, e.g. a wellbore of a well. The method 110 further comprises propagating 114 the RF signal to the device to resist formation and/or build-up of scale deposits at the device.

In the illustrated embodiment, the method 110 further comprises prior to propagating 114 the RF signal, selecting 116 a signal parameter based on a device parameter. The signal parameter comprises a strength, impedance, frequency, voltage and current of the signal. The device parameter comprises a distance from an feed point of the RF signal in the line to the device, or a length of the line. The described tuneable component adjust the signal parameter based on the device parameter as described.

While an RF signal has been described as being fed into a cable 24, in another embodiment, the RF signal is specifically fed into a wire of the cable. The RF signal is then propagated along the wire to the downhole device.

In addition, while the feed point has been described as being in a junction box, other feed points are possible. The RF signal may be fed at any point along the wire. For example, the RF signal may be fed at the wellhead 20. The RF signal is propagated along the wire to the downhole device which is within the well associated with the wellhead 20. The RF signal so fed, and propagated beneficially resists formation and/or build-up of scale deposits on at the downhole device.

In another embodiment, a point of feeding or feed point of the RF signal is at equipment present at a surface location of a well. Exemplary equipment includes a transformer, filter, motor, a wellhead or similar. A feed point which is at existing equipment present at a well site, such as any of the above or the described junction box 18, ensures that additional equipment is not required to provide a feed point for the RF signal.

While a particular line has been described, cable 24, one of skill in the art will appreciate that other lines are possible. For example, the line may comprise a power line, data line, control line, hydraulic line or the like. Such lines may comprise cables, wires, insulation, sheath or similar. Additionally the line may comprise a sheath or insulation of any of the described lines. The line provides a signal path for the fed RF signal to the device. As the RF signal is useful for resisting formation and build-up of scale deposits, the RF signal fed, and propagated along the line beneficially resists formation and build-up of scale deposits at the device.

Furthermore, while a device comprising an ESP has been described, other devices are contemplated. In another embodiment, the device comprises a valve, e.g. a subsurface safety valve, downhole tool or similar. In addition to the noted issues with scale on an ESP, scale on a valve may result in improper valve opening or closing, and difficulty in actuating the valve. The RF signal is fed along a line connected to the vale ensuring the RF signal is targeted to the valve for resisting formation and build-up of scale deposits at the valve.

It should be understood that arrangements or embodiments described herein are merely exemplary and that various modifications may be made thereto without departing from the scope of the disclosure as defined by the claims appended hereto.

The invention claimed is:

1. A method for treating an electric submersible pump (ESP) to resist formation and build-up of scale deposits at the ESP, the ESP being located in a fluid-containing conduit, the method comprising:
introducing a variable, pulsed radio frequency (RF) signal into a primary coil of a transformer;
transferring the RF signal to a power line connected to the ESP located in a fluid-containing conduit via a first terminal of a secondary coil of the transformer connected to the power line, a second terminal of the secondary coil being operably grounded, and the power line being for providing power to the ESP; and
propagating the RF signal and an associated electromagnetic field along a signal path defined by the power line to the ESP and throughout the ESP to resist formation and/or build-up of scale deposits at the ESP.

2. The method of claim 1, wherein the power line is electrically insulated and the RF signal is propagated within insulation.

3. The method of claim 1, wherein the power line is a single phase of a three-phase power cable.

4. The method of claim 1, wherein the power line is a shielding layer of a cable.

5. The method of claim 1, wherein the fluid-containing conduit comprises a well.

6. The method of claim 1, further comprising:
selecting a parameter of the RF signal based on a parameter of the ESP prior to propagating the RF signal, wherein the parameter of the RF signal comprises at least one of signal strength, frequency, voltage and current.

7. The method of claim 6, wherein the parameter of the ESP comprises at least one of a distance of the ESP from a feed point of the RF signal, and a length of the power line.

8. The method of claim 1, wherein the transferring the RF signal comprises transferring the RF signal to the power line at a location uphole of the ESP.

9. The method of claim 8, wherein the location is outside of a well.

10. The method of claim 1, wherein the power line is configured to pass through a valve arrangement to the ESP.

11. The method of claim 1, wherein the RF signal is fed into the power line at an electrical junction box.

12. The method of claim 11, wherein the RF signal is fed to multiple lines electrically connected at the electrical junction box, the power line including the multiple lines.

13. A system for treating an electric submersible pump (ESP) to resist formation and build-up of scale deposits at the ESP, the ESP being located in a fluid-containing conduit, the system comprising:
an ESP located in a fluid-containing conduit;
a power line connected to the ESP;
a signal generator comprising a transformer comprising a primary coil and a secondary coil; and
a microcontroller operable to generate a variable, pulsed radio frequency (RF) signal to be introduced into the primary coil and transferred to the power line connected to the ESP located in the fluid-containing conduit via a first terminal of the secondary coil connected to the power line, a second terminal of the secondary coil being operably grounded, and the power line being for providing power to the ESP, the signal generator further operable to propagate the RF signal and an associated electromagnetic field along a signal path defined by the power line to the ESP and throughout the ESP to resist formation and/or build-up of scale deposits at the ESP.

14. The method of claim 1, wherein the transferring the RF signal into the power line comprises inducting the RF signal into the power line.

15. The method of claim 14, wherein the inducting the RF signal comprises establishing a field around the power line to transfer the RF signal into the power line.

16. The method of claim 1, further comprising transferring the RF signal to the secondary coil of the transformer, the secondary coil connected to armour of the power line connected to the ESP located in the fluid-containing conduit.

17. The method of claim 1, wherein the secondary coil is operably connected to ground to form a current return path.

18. The method of claim 1, wherein a frequency of the RF signal is between 100 and 220 kHz.

* * * * *